United States Patent
Fujii

(10) Patent No.: US 9,139,740 B2
(45) Date of Patent: Sep. 22, 2015

(54) FLOW MODIFIER FOR WATER-BASED COATING MATERIAL AND WATER-BASED COATING COMPOSITION CONTAINING SAME

(75) Inventor: Takeshi Fujii, Hiratsuka (JP)

(73) Assignee: KANSAI PAINT CO., LTD., Hyogo (JP)

( * ) Notice: Subject to any disclaimer, the term of this patent is extended or adjusted under 35 U.S.C. 154(b) by 611 days.

(21) Appl. No.: 13/203,781

(22) PCT Filed: Mar. 3, 2010

(86) PCT No.: PCT/JP2010/053472
§ 371 (c)(1),
(2), (4) Date: Aug. 29, 2011

(87) PCT Pub. No.: WO2010/101196
PCT Pub. Date: Sep. 10, 2010

(65) Prior Publication Data
US 2012/0022205 A1  Jan. 26, 2012

(30) Foreign Application Priority Data
Mar. 3, 2009 (JP) ................................. 2009-049808

(51) Int. Cl.
C08F 265/00 (2006.01)
C09D 5/02 (2006.01)
C08F 265/10 (2006.01)
C08F 283/04 (2006.01)
C08F 283/06 (2006.01)
C09D 7/00 (2006.01)
C08L 33/26 (2006.01)

(52) U.S. Cl.
CPC .............. *C09D 5/024* (2013.01); *C08F 265/10* (2013.01); *C08F 283/04* (2013.01); *C08F 283/06* (2013.01); *C09D 7/002* (2013.01); *C08L 33/26* (2013.01)

(58) Field of Classification Search
CPC ............................ C08F 265/10; C08F 283/04
USPC ......................................... 525/293, 303, 308
See application file for complete search history.

(56) References Cited

U.S. PATENT DOCUMENTS

| 5,708,095 | A | 1/1998 | Grezzo Page et al. |
| 7,056,972 | B2 | 6/2006 | Nakazawa et al. |
| 7,067,590 | B2 | 6/2006 | Sato et al. |
| 7,115,255 | B2 | 10/2006 | L'Alloret |
| 2002/0186288 | A1 | 12/2002 | Nakazawa et al. |
| 2003/0050364 | A1 | 3/2003 | Sato et al. |
| 2004/0044130 | A1 | 3/2004 | Labeau et al. |
| 2004/0214913 | A1 | 10/2004 | L'Alloret |

FOREIGN PATENT DOCUMENTS

| EP | 0534015 | 3/1993 |
| JP | 03-285903 | 12/1991 |
| JP | 06-157689 | 6/1994 |
| JP | 09-031138 | 2/1997 |
| JP | 10-87754 | 4/1998 |
| JP | 10-204409 | 8/1998 |
| JP | 10-323557 | 12/1998 |
| JP | 2002-121230 | 4/2002 |
| JP | 2003-119342 | 4/2003 |
| JP | 2003-522210 | 7/2003 |
| JP | 2004-515570 | 5/2004 |
| JP | 2007-23297 | 2/2007 |
| JP | 2007-217348 | 8/2007 |
| WO | WO 2007012763 A1 * | 2/2007 |

OTHER PUBLICATIONS

Translation of JP 09031138 A, 1997.*
International Search Report issued May 18, 2010 in International (PCT) Application No. PCT/JP2010/053472, of which the present application is the national stage.

* cited by examiner

*Primary Examiner* — Wenwen Cai
(74) *Attorney, Agent, or Firm* — Wenderoth, Lind & Ponack, L.L.P.

(57) ABSTRACT

An object of the present invention is to provide a graft copolymer that is usable as various functional materials, that is stimulus responsive, and that is soluble in water at ordinary temperatures; and to provide an aqueous coating composition that comprises the graft copolymer as a thickener. The present invention also provides a rheology modifier for an aqueous coating composition comprising a graft copolymer consisting of (A) a main chain comprising an N-substituted (meth)acrylamide compound and having a lower critical solution temperature in water of 40° C. or higher, and (B) a hydrophobic side chain.

3 Claims, No Drawings

FLOW MODIFIER FOR WATER-BASED COATING MATERIAL AND WATER-BASED COATING COMPOSITION CONTAINING SAME

TECHNICAL FIELD

The present invention relates to a graft copolymer that is usable as various functional materials, that is stimulus-responsive, and that is soluble in water at ordinary temperatures, and an aqueous coating composition that comprises the graft copolymer as a thickener. In particular, the present invention relates to an aqueous coating composition that comprises a graft copolymer as a rheology modifier having a thickening property at ordinary temperatures by utilizing the fact that because the main chain of the copolymer has a lower critical solution temperature (LCST), the copolymer dissolves at normal temperatures to exhibit a high thickening effect due to its intermolecular interaction (association) and aggregates upon heating to no longer exhibit the interaction.

BACKGROUND ART

There has been extensive investigation of the use of stimuli-responsive materials as industrially applicable functional materials. Among these, many organic materials, such as thermochromic leuco dyes and heat-sensitive liquid crystal materials, are in practical use for thermal response, i.e., response to heat, which is the most common form of stimulation.

Non-patent Literature 1 and 2 are a review on stimuli-responsive polymers and also mention graft polymers.

In addition, patent applications that have a technical feature of using stimuli-responsive polymers with a controlled structure have been filed. Patent Literature 1 discloses a polymer gel film made of a thermally responsive graft polymer. Patent Literature 2 discloses a composition that comprises an ABC-type block polymer including at least one stimuli-responsive block, and also discloses use of the composition as an ink composition, an image-forming method using the composition, and the like.

Further, Patent Literature 3 discloses that the use of an aqueous solvent, in particular, in the composition disclosed in Patent Literature 2, provides materials having excellent dispersion stability. Patent Literature 2 and 3 also disclose in the detailed description that the state of a system undergoes a "critical change" in response to stimuli, and disclose causing a temperature-induced sol-gel transition as an example of preferred change. Additionally, it is disclosed that the temperature that causes the critical change is about 20° C. in polyethoxyethyl vinyl ether and about 70° C. in polymethoxyethyl vinyl ether.

As a patent application that employs heat-thickening action of thermally responsive polymers, in particular, Patent Literature 4 discloses using a graft polymer in which one of a main chain segment and side chain segments has an LCST of 30 to 80° C. and the other is water-soluble, as a heat-thickening composition for coating of paper. Patent Literature 5 discloses an aqueous composition comprising a water-soluble polymer chain to which a polymer chain with an LCST is block-linked or grafted. Patent Literature 6 discloses a block copolymer thickener consisting of a hydrophilic polymer and a polymer having an LCST of 0 to 50° C. The compositions disclosed in Patent Literature 5 and 6 are used as cosmetics.

Meanwhile, Patent Literature 7 discloses a graft copolymer consisting of a hydrophilic main chain and a hydrophobic side chain. The graft copolymer disclosed in Patent Literature 7 is used as an aqueous ink pigment dispersion, and N-alkyl-substituted (meth)acrylamide is exemplified as a constituent monomer of the side chain. However, Patent Literature 7 nowhere discloses an LCST of the main chain and is also silent about thermal sensitivity and the function provided thereby.

CITATION LIST

Patent Literature

PTL 1: Japanese Unexamined Patent Publication No. H06-157689
PTL 2: Japanese Unexamined Patent Publication No. 2003-119342
PTL 3: Japanese Unexamined Patent Publication No. 2007-23297
PTL 4: Japanese Unexamined Patent Publication No. 2003-522210
PTL 5: Japanese Unexamined Patent Publication No. 2004-515570
PTL 6: Japanese Unexamined Patent Publication No. 2007-217348
PTL 7: Japanese Unexamined Patent Publication No. H10-87754

Non-Patent Literature

NPL 1: Sadahito AOSHIMA, Kobunshi; High polymers, Japan, Vol. 46, pages 497-502 (1997)
NPL 2: Sadahito AOSHIMA, Kobunshi ronbunshu; Japanese Journal of Polymer Science and Technology, Vol. 63, pages 71-85 (2006)

SUMMARY OF INVENTION

Technical Problem

An object of the invention is to provide a graft copolymer that is thermally responsive and soluble in water at ordinary temperatures. Another object of the invention is to provide an aqueous coating composition that contains the graft copolymer as a rheology modifier having a thickening property at ordinary temperatures.

Solution to Problem

Under such circumstances, the present inventors conducted extensive research and found that a graft copolymer whose main chain portion has a specific lower critical solution temperature (LCST), i.e., 40° C. or higher, and whose side chain portion is hydrophobic, exhibits a high viscosity at ordinary temperatures when formed into an aqueous solution, and its viscosity dramatically drops by heating. They also found that a composition containing the polymer is usable as a thermo-responsive rheology modifier for an aqueous coating composition. The present invention relates to the following items:

Item 1. A rheology modifier for an aqueous coating composition comprising a graft copolymer consisting of:
(A) a main chain containing an N-substituted (meth)acrylamide compound in a monomer component and having a lower critical solution temperature in water of 40° C. or higher; and (B) a hydrophobic side chain.

Item 2. The rheology modifier for an aqueous coating composition according to Item 1, wherein the graft copolymer is obtained by a radical copolymerization of an N-substituted (meth)acrylamide compound, a hydrophobic macromonomer, and other unsaturated monomers if necessary.

Item 3. The rheology modifier for an aqueous coating composition according to Item 2, wherein the graft copolymer is obtained by a radical copolymerization of 1 to 99 parts by mass of an N-substituted (meth)acrylamide compound; 1 to 30 parts by mass of a hydrophobic macromonomer; and 0 to 98 parts by mass of other unsaturated monomer, relative to 100 parts by mass of the total amount of the monomers.

Item 4. An aqueous coating composition comprising any one of the rheology modifier for an aqueous coating composition of Items 1 to 3.

Item 5. An article coated with the aqueous coating composition of Item 4.

Advantageous Effects of Invention

The graft copolymer, which is an active ingredient of the rheology modifier for an aqueous coating composition of the present invention, has a very simple structure and is readily produced. A thickener prepared by dissolving the graft copolymer in water has thermal responsiveness itself.

The lower critical solution temperature of the graft copolymer is adjustable by suitably selecting the constituent monomers of the main chain portion. Therefore, the graft copolymer can be used while suitably designing the temperature at which the viscosity changes in accordance with the usage conditions.

When an aqueous solution or aqueous dispersion of the graft copolymer of the present invention is used as a rheology modifier for an aqueous coating composition that is subjected to forced drying and/or curing by baking, an aqueous coating composition having the following properties can be obtained. That is, the aqueous coating composition has a high viscosity when applied under ordinary temperatures, and exhibits excellent sagging resistance. When it is heated, its viscosity decreases and its flowability increases, obtaining a cured coating film having excellent surface smoothness.

DESCRIPTION OF EMBODIMENTS

The graft copolymer of the present invention is explained in detail below.

The graft copolymer used in the present invention (hereunder, sometimes referred to as a "graft polymer") comprises a main chain portion that contains an N-substituted (meth)acrylamide compound as an essential monomer component, and has a lower critical solution temperature in water of 40° C. or higher. The side chain portion of the graft copolymer used in the present invention is hydrophobic.

Such a main chain portion can be obtained by copolymerizing an N-substituted (meth)acrylamide compound with other unsaturated monomers. Hereunder, the monomers used in main chain portion are explained.

N-substituted (meth)acrylamide compounds: an N-substituted (meth)acrylamide compound is used as an essential monomer in the present invention. In the present invention, N-alkylacrylamide, N-allylacrylamide, N-alkylmethacrylamide, N-allylmethacrylamide, N,N-dialkylacrylamide, N,N-diallylacrylamide, N-alkyl, N-allylacrylamide, N,N-dialkylmethacrylamide, N,N-diallylmethacrylamide, N-alkyl, N-allylmethacrylamide and derivatives thereof are generically called N-substituted (meth)acrylamide compounds.

Specific examples thereof include N-methylacrylamide, N-butoxymethylacrylamide, N-ethylacrylamide, n-propylacrylamide, N-isopropylacrylamide, N-cyclopropylacrylamide, N-hydroxyethylacrylamide, N-methylolacrylamide methyl ether, N-methylolacrylamide ethyl ether, N-methylolacrylamide propyl ether, N-methylolacrylamide butyl ether, acryloyl morpholine, diacetone acrylamide, N-methylmethacrylamide, N-butoxymethylmethacrylamide, N-ethylmethacrylamide, N-n-propylmethacrylamide, N-isopropylmethacrylamide, N-cyclopropylmethacrylamide, diacetone methacrylamide, N,N-dimethylacrylamide, N,N-diethylacrylamide, methyl, N-ethylacrylamide, N,N-dimethylmethacrylamide, N,N-diethylmethacrylamide, N,N-dimethylaminopropylacrylamide, and N-methyl, N-ethylmethacrylamide.

Among these, the following are well known for the fact that their homopolymers indicate an LCST: N-isopropylacrylamide (LCST of 30.9° C.), N-n-propylacrylamide (LCST of 21.5° C.), N-n-propylmethacrylamide (LCST of 28.0° C.), and N,N-diethylacrylamide (LCST of 32.0° C.) (reference document: Shoji ITO, Kobunshi ronbunshu; Japanese Journal of Polymer Science and Technology 46(7), pp. 437-443 (1989)).

In the present invention, by radically copolymerizing an N-substituted (meth)acrylamide compound with other unsaturated monomers, a main chain exhibiting an LCST of 40° C. or higher can be synthesized. In this case, it is preferable that at least one monomer selected from N-isopropylacrylamide, N-n-propylacrylamide, N,N-dimethylacrylamide, and N,N-diethylacrylamide be contained as the N-substituted (meth) acrylamide from the viewpoint of water solubility, etc.

In the present invention, any known radical polymerizable unsaturated monomers may be suitably used as the monomer to be copolymerized with an N-substituted (meth)acrylamide. Examples of monomers that contain one unsaturated group per molecule are as follows.

Examples of acryloyl monomers include methyl acrylate, ethyl acrylate, isopropyl acrylate, n-butyl acrylate, isobutyl acrylate, tert-butyl acrylate, 2-ethylhexyl acrylate, stearyl acrylate and like $C_{1-24}$ alkyl acrylates; acrylic acid; 2-hydroxyethyl acrylate and like hydroxyalkyl acrylates; glycidyl acrylate, 3,4-epoxycyclohexyl methylacrylate, and like epoxy-containing acrylates; N,N-dimethylaminoethyl acrylate, N,N-diethylaminoethyl acrylate, N,N-dimethylaminopropyl acrylate, and like aminoalkyl acrylates; 3-ethyl-3-acryloyl oxymethyloxetane, 3-methyl-3-acryloyl oxymethyloxetane, and like oxetane ring-containing acrylates.

Examples of methacryloyl monomers include methyl methacrylate, ethyl methacrylate, n-propyl methacrylate, isopropyl methacrylate, n-butyl methacrylate, isobutyl methacrylate, tart-butyl methacrylate, 2-ethylhexyl methacrylate, n-octyl methacrylate, lauryl methacrylate, tridecyl methacrylate, stearyl methacrylate, and like $C_{1-24}$ alkyl methacrylates; methacrylic acid; 2-hydroxyethyl methacrylate, hydroxypropyl methacrylate, 4-hydroxybutyl methacrylate, and like hydroxyalkyl methacrylates; glycidyl methacrylate, 3,4-epoxycyclohexyl methylmethacrylate, and like epoxy-containing methacrylates; N,N-dimethylaminoethyl methacrylate, N,N-diethylaminoethyl methacrylate, N,N-dimethylaminopropyl methacrylate, and like aminoalkyl methacrylates; 3-ethyl-3-methacryloyloxy methyloxetane, 3-methyl-3-methacryloyloxy methyloxetane, 3-butyl-3-methacryloyl oxymethyloxetane, and like oxetane ring-containing methacrylates; γ-methacryloyl oxypropyltrimethoxysilane, β-methacryloyl oxyethyltrimethoxysilane, and like alkoxysilyl-containing methacrylates; Silaplane FM-0711 (produced by Chisso Corporation) and like dimethyl polysiloxane-containing methacrylates; and hexafluoroisopropyl methacrylate, perfluorooctyl methyl methacrylate, perfluorooctyl ethyl methacrylate, and like fluorine-containing methacrylates.

Examples of other radical polymerizable unsaturated monomers that contain one unsaturated group include acrylonitrile, methacrylonitrile, styrene, and vinyl toluene.

Examples of monomers containing two or more unsaturated groups include ethylene glycol dimethacrylate, ethylene glycol diacrylate, 1,4-butanediol dimethacrylate, trimethylolpropane triacrylate, polyethylene glycol dimethacrylate, cyanuric acid triacrylate, triacrylformal, and like (meth)acrylic-based polyfunctional monomers; and triallylcyanurate, triallylisocyanurate, triallyltrimellitate, diethylene glycol diallyl ether, and like allyl-based polyfunctional monomers. These monomers that contain two or more unsaturated groups cause the main chain of the graft polymer to branch and three-dimensionally gelate; therefore, a large amount of such monomers cannot be used. In the present invention, the amount of such monomers used is preferably 1 mass % or less relative to the total amount of monomers used in synthesizing the graft polymer, and more preferably such monomers are not used at all.

Method for Producing a Graft Polymer

The graft polymer used in the present invention has a hydrophobic side chain. In the present invention, the side chain is the portion that is grafted to the main chain in the graft polymer.

One example of a method for obtaining such a graft polymer is to prepare the polymer that will become the main chain in advance by a known method, and then graft polymerize a hydrophobic monomer to the resulting polymer. Alternatively, a graft polymer can be manufactured in a single step by copolymerizing a hydrophobic macromonomer.

Among various methods, in order to readily obtain a graft polymer, a method in which a hydrophobic macromonomer is copolymerized is preferable. Methods for synthesizing a hydrophobic macromonomer preferably used in the present invention are described below.

There are various known methods for synthesizing a macromonomer. For example, Japanese Examined Patent Publication No. 1968-11224 discloses a method for preparing a macromonomer by introducing a carboxylic acid group to the end of a polymer chain using a chain transfer agent, such as mercaptopropionic acid, in the process for preparing the macromonomer, and then introducing an ethylenically unsaturated group by adding methacrylic glycidyl thereto. Japanese Examined Patent Publication No. 1994-23209 and Japanese Examined Patent Publication No. 1995-35411 disclose a method employing catalytic chain transfer polymerization (CCTP) using a cobalt complex. Japanese Unexamined Patent Publication No. 1995-002954 discloses a method for obtaining a graft copolymer in which 2,4-diphenyl-4-methyl-1-pentene is subjected to radical polymerization using an addition-fragmentation chain transfer agent to obtain a macromonomer, and then this macromonomer is copolymerized with other ethylenic unsaturated monomers.

There is another method for producing a macromonomer in which glycidyl methacrylate is added to polyester resin (preferably linear polyester resin) having a carboxyl group at the end through ring opening addition.

Among these methods, the one using a chain transfer agent such as mercaptopropionic acid may be problematic because it requires the use of a mercaptan-based chain transfer agent having a strong odor, the types of functional groups in the unsaturated monomers that can be used to produce the macromonomer are greatly limited, the process for obtaining a graft copolymer is complicated, and the like. Furthermore, in the method employing catalytic chain transfer polymerization using a cobalt complex, in order to prevent the occurrence of catalytic chain transfer polymerization between the macromonomer and other monomers when they are radically polymerized, it is necessary to remove the cobalt complex or to chemically eliminate its catalytic activity. In contrast, the method for producing a macromonomer using 2,4-diphenyl-4-methyl-1-pentene as an addition-fragmentation chain transfer agent and performing radical polymerization is preferable as there are few problems in its industrial utilization.

Examples of monomers that are usable as starting materials for the macromonomer include alkyl (meth)acrylate, hydroxyalkyl (meth)acrylate, and (meth)acrylic acid.

Examples of alkyl (meth)acrylates include alkyl (meth)acrylate having a $C_{1-24}$ alkyl group, and preferably a $C_{4-18}$ alkyl group. More specifically, n-butyl methacrylate, 2-ethylhexyl methacrylate, and stearyl methacrylate.

Examples of hydroxyalkyl (meth)acrylates include an alkyl (meth)acrylate having $C_{1-24}$ alkyl group, preferably $C_{1-8}$ alkyl group, and one or two and preferably one hydroxyl group. Specific examples thereof include 2-hydroxyethyl methacrylate.

Because this macromonomer forms the hydrophobic side chain of the graft polymer, alkyl methacrylate having a $C_{1-24}$ alkyl group is preferable, and alkyl methacrylate having a $C_{4-18}$ alkyl group is more preferable. In the present invention, the macromonomer preferably has a weight average molecular weight of 1,500 or more in order to impart a satisfactory thickening effect to the graft polymer (an aqueous solution thereof) prepared using the macromonomer. In the preferable embodiment, the proportion of the alkyl methacrylate relative to the total amount of 100 parts by mass of monomer mixture, which is a starting material for the macromonomer, is, for example, 30 to 100 mass, and preferably 45 to 90 mass % from the viewpoint of imparting hydrophobicity to the resulting macromonomer.

In the present invention, the proportions by mass of the N-substituted (meth)acrylamide compound, other monomers, and macromonomer that constitute the graft copolymer, relative to 100 parts by mass of the total amount, are preferably 50 to 90/0 to 49/1 to 30 (parts by mass), and more preferably 50 to 90/0 to 30/5 to 20. When the proportion of the macromonomer exceeds 30 parts by mass relative to the total amount, the amount of the hydrophobic component becomes excessive, and this may result in unsatisfactory water solubility for the graft polymer at ordinary temperatures. When the proportion of the macromonomer is less than one part by mass, the thickening effect at ordinary temperatures, which is believed to be attributable to the hydrophobic interaction between the coating component and the graft polymer, may become unsatisfactory when the macromonomer is mixed with an aqueous coating composition.

In terms of the ratio of the N-substituted (meth)acrylamide compound to other monomers, the types and amounts of the monomers can be changed depending on the targeted LCST. However, an N-substituted (meth)acrylamide compound polymer exhibits a very sharp change in dissolution behavior before and after the LCST, but almost all of the other monomers exhibit a slow change or no change; therefore, in order to obtain the desired sharp thermal response of the present invention, the amount of the N-substituted (meth)acrylamide compound is preferably 50 parts by mass or more relative to the total amount.

The graft polymer may be produced by selecting a suitable method from various known radical polymerization methods, such as the bulk polymerization method, solution polymerization method, and emulsion polymerization method. Among these, the ordinary solution polymerization method is preferably employed because of its simple polymerization. In this case, examples of usable polymerization initiators include cyclohexanone peroxide, 3,3,5-trimethylcyclohexanone peroxide, methylcyclohexanone peroxide, 1,1-bis(tert-butylperoxy)-3,3,5-trimethylcyclohexane, 1,1-bis(tert-butylperoxy)cyclohexane, n-butyl-4,4-bis(tert-butylperoxy) valerate, cumenehydro peroxide, 2,5-dimethylhexane-2,5-dihydroperoxide, 1,3-bis(tert-butylperoxy-m-isopropyl) benzene, 2,5-dimethyl-2,5-di(tert-butylperoxy)hexane, diisopropylbenzene peroxide, tert-butylcumyl peroxide, decanoyl peroxide, lauroyl peroxide, benzoyl peroxide, 2,4-dichlorobenzoyl peroxide, bis(tert-butylcyclohexyl)peroxi dicarbonate, tert-butylperoxy benzoate, 2,5-dimethyl-2,5-di(benzoylperoxy)hexane and like peroxide-based polymerization initiators; and 2,2'-azobis(isobutyronitrile), 1,1-azobis (cyclohexane-1-carbonitrile), azocumene, 2,2'-azobis(2-methylbutyronitrile), 2,2'-azobis dimethylvaleronitrile, 4,4'-azobis(4-cyanovaleric acid), 2-(t-butylazo)-2-cyanopropane, 2,2'-azobis(2,4,4-trimethylpentane), 2,2'-azobis(2-methylpropane), dimethyl 2,2'-azobis(2-methylpropionate), and like azo-based polymerization initiators. The amount of the radical polymerization initiator used is not particularly limited; however, the amount thereof is generally 0.1 to 20 parts by mass, and preferably 0.5 to 10 parts by mass relative to 100 parts by mass of the total monomer components. Preferable media are those that do not easily cause a chain transfer into a solvent and that are aqueous organic solvents. Examples of such solvents include ethylene glycol monomethyl etheracetate, diethylene glycol monobutyl ether acetate and like ester-based solvents; methyl ethyl ketone, methyl isobutyl ketone, diisobutyl ketone, cyclohexanone, and like ketone-based solvents; methanol, ethanol, isopropanol, n-butanol, sec-butanol, isobutanol, and like alcohol-based solvents; and n-butyl ether, dioxane, ethylene glycol monomethyl ether, ethylene glycol monoethyl ether, and like ether-based solvents. These organic solvents may be used singly or in a combination of two or more. During the radical polymerization, these organic solvents are used generally in an amount of 400 wt % or less relative to the total amount of the monomer components.

The weight average molecular weight of the graft polymer is preferably 20,000 or higher and more preferably 100,000 or higher to obtain the desired thickening property.

In the present invention, the weight average molecular weight of the graft polymer and the weight average molecular weight of the macromonomer are determined by measuring the retention time (retention volume) thereof using Gel Permeation Chromatography (GPC), and converting the values into those of polystyrene using the retention time (retention volume) of the standard polystyrene, whose molecular weight is known, measured under the same conditions.

The weight average molecular weight of the graft polymer can be measured using a gel permeation chromatography apparatus (HLC8120GPC, produced by Tosoh Corporation) together with one column (TSKgel GMHHR-L, produced by Tosoh Corporation), and a differential refractometer as a detector under the following conditions: mobile phase, N,N-dimethylformamide (containing 10 mM lithium bromide and 10 mM phosphate); measurement temperature, 25° C.; and flow rate, 1 mL/min.

The weight average molecular weight of the macromonomer can be measured using a gel permeation chromatography apparatus (HLC8120GPC, produced by Tosoh Corporation) together with four columns (TSKgel G-4000 HXL, TSKgel G-3000 HXL, TSKgel G-2500 HXL, and TSKgel G-2000 HXL, produced by Tosoh Corporation), and a differential refractometer as a detector under the following conditions: mobile phase, tetrahydrofuran; measurement temperature, 40° C.; and flow rate, 1 mL/min.

The LCST of the main chain portion produced by copolymerization can be obtained by measurement. Conveniently, the viscosity of a dilute aqueous solution of a single copolymer having a concentration of about 1 to 5 mass % is measured using a variable temperature-type viscometer. The measurement starts at room temperature and the viscosity is measured while increasing the temperature. The temperature at which the viscosity rapidly decreases, i.e., the peak temperature at the differential viscosity curve, can be determined as the lower critical solution temperature. In a more convenient method, the transparency of the aqueous solution is visually observed while increasing the temperature, and the cloud temperature (the temperature at which the solution becomes cloudy due to polymer aggregation) is determined to be the lower critical solution temperature.

The present invention is characterized in that a graft polymer comprising a main chain having LCST and a hydrophobic side chain is used as a rheology modifier (thickener). Here, hydrophobic generally means the property of having a low compatibility with water. In the present invention, hydrophobic means the state of being substantially insoluble in water at 20° C. One example for determining hydrophobicity is such that a macromonomer is prepared separately from the main chain, and the macromonomer is determined to be hydrophobic when the mass of the macromonomer soluble in 100 g of water at 20° C. is 5 g or less, preferably 2 g or less, and more preferably 1 g or less.

In the case of an aqueous solution of a polymer that does not have a hydrophobic side chain and exhibits a simple LCST, the change in the viscosity of the solution before and after the LCST is not sufficient. In contrast, an aqueous solution of a graft polymer having the hydrophobic side chain of the present invention exhibits a sufficiently large change in the viscosity before and after the LCST. The reason for this is not clear, but presumably the present invention has a special feature in its dissolving condition. Specifically, in an aqueous condition at a temperature equal to the LCST or lower, the graft polymer of the present invention exhibits hydrophobic interaction in its side chain portion with another side chain in the same graft polymer or with a side chain in another graft polymer; therefore, the polymers interactively form a network-like structure in the solution. As a result, the solution has a high viscosity at a temperature equal to or less than LCST (exhibiting a greater thickening effect).

In this case, because a macromonomer is used as a comonomer, in order to more accurately measure the LCST of the main chain portion, it is preferable that the "polymer consisting only of a main chain" be measured to determine the LCST.

This effect becomes more remarkable when it synergistically increases the hydrophobic interaction with the binder used in a coating composition. For this reason, the effect becomes more remarkable when the binder contained in the aqueous coating composition is a water-dispersible resin having a hydrophobic portion rather than a water-soluble resin.

Method for Using a Thermal Responsive Thickening Composition

The thermo-responsive rheology modifier of the present invention that contains the graft polymer described above and that increases the viscosity at ordinary temperatures has the following characteristic. A mixture, such as a coating composition comprising the thermo-responsive rheology modifier, is a jelly-like form or a viscous liquid at ordinary temperatures, and, when it is heated to a temperature higher than the LCST of the main chain of the graft polymer, its viscosity greatly decreases and its fluidity increases. One example of a particularly preferable usage thereof is the use of a thermo-responsive rheology modifier that comprises a graft polymer and that increases viscosity at ordinary temperatures as a thickener for an aqueous coating composition. By containing 0.1 to 20 parts by mass of the graft polymer of the present invention, on a solids basis, relative to 100 parts by mass of the binder solid component of the coating composition, the coating composition has a high viscosity when it is applied at ordinary temperatures. This prevents so-called "sagging," i.e., dropping of the coating film along a vertical plane.

While drying or heating, the viscosity of the coating composition is rapidly lowered near the desired temperature due to an increase in the temperature. This improves the fluidity and smoothness at the surface and eliminates the "brush marks" that are observed in brush coating, the "roller marks" in roll coating, the small "spray marks" in spray coating, the "vortex patterns," which are relatively large concave and convex patterns formed by solvent volatilization, and the like, to obtain a coated surface with an excellent finished appearance. As described above, the present invention makes it possible to obtain an aqueous coating composition that can achieve satisfactory coatability and an excellent finished appearance. In this case, the aqueous coating composition that serves as a base coat may be a single-liquid type, two-liquid type, lacquer type, or thermosetting type.

The aqueous coating composition may comprise a binder and water, which is a diluent, as well as auxiliary materials generally used for a coating composition, such as organic solvents, extender pigments, coloring pigments, luster materials, catalysts, and various additives. Examples of additives include coated-surface controlling agents, light absorbents, antioxidants, dispersants, antimold agents, and anti-sagging agents. When the aqueous coating composition contains no or very little coloring pigment and the coating film is transparent, the aqueous coating composition is sometimes referred to as a clear coating composition; when it contains a coloring pigment, it is sometimes referred to as an enamel coating composition; and when it contains a luster material (and a coloring pigment if necessary), it is sometimes referred to as a metallic coating composition.

When the aqueous coating composition is a lacquer type, a brush or a roller is often used to apply it. In this case, by heating the coated surface using a hot-air dryer (dryer), an electrical heater, an infrared heater, or the like, brush marks and roller marks can be erased, thereby obtaining a smooth coated surface.

When the aqueous coating composition is a thermosetting type, which is often used in coating compositions for industrial use, spray coating is applied in many cases. In this case, by setting the LCST of the main chain portion of the graft polymer of the present invention not lower than the spray coating temperature (i.e., an ordinary temperature), and not exceeding the baking temperature, the occurrence of sagging can be prevented and spray marks and/or vortex patterns can be eliminated.

As described above, a rheology modifier having a thickening property at ordinary temperatures that comprises the graft polymer of the present invention can achieve, as a thickener, satisfactory coatability and excellent smoothness of the coating film of an aqueous coating composition, in particular, that contains the aforementioned rheology modifier.

The present invention is described below in more detail with reference to Synthesis Examples, Examples, and Comparative Examples. However, the present invention is not limited to these examples. In the examples, "parts" and "%" are expressed on a mass basis.

EXAMPLES

Synthesis of a Macromonomer Forming a Hydrophobic Side Chain Portion

Synthesis Example 1

83 parts of ethylene glycol monobutyl ether and 37 parts of butyl acetate were placed into a reaction vessel equipped with a thermometer, a thermostat, a stirrer, a reflux condenser, a nitrogen inlet tube, and a dropper. The reaction mixture was stirred at 90° C. while blowing nitrogen gas into the gas phase. A mixture of 50 parts of n-butyl methacrylate, 50 parts of 2-hydroxyethyl methacrylate, 8 parts of mercaptopropionic acid, and 2 parts of 2,2'-azobisisobutyronitrile was added dropwise over a period of 4 hours at a fixed speed to perform a polymerization reaction. Thereafter, the mixture was aged at the same temperature for 2 hours and heated at 110° C. for 1 hour to obtain a prepolymer solution with a solids content of 47%. The obtained prepolymer had an acid value of 39.2 mgKOH/g on a solids basis. Subsequently, 0.04 part of hydroquinone monomethyl ether that functioned as a polymerization inhibitor and 11 parts of glycidyl methacrylate were added and 3 parts of tetrabutylammonium bromide was further added thereto. The resulting mixture was allowed to react at 110° C. for 12 hours and then butyl acetate was removed by reducing the pressure to obtain a macromonomer solution (MM-1) with a solids content of 65%. The reaction rate of the glycidyl group of glycidyl methacrylate in this reaction was 96%. The resulting macromonomer had an average of 1.0 polymerizable double bond per molecule, comprised a terminal methacrylate-type macromonomer as a main component, and had a weight average molecular weight of 3,000.

Synthesis Example 2

Both methacrylic acid ester and solvent were deaerated (deoxidized) by supplying nitrogen gas for at least 1 hour before use.

30 parts of xylene and 25 parts of ethyl acetate were placed into a reaction vessel equipped with a thermometer, a thermostat, a stirrer, a reflux condenser, a nitrogen inlet tube, and a dropper. The reaction mixture was heated to 105° C. while supplying nitrogen gas into the liquid. A mixture of 50 parts of n-butyl methacrylate, 50 parts of 2-hydroxyethyl methacrylate, 0.01 part of bis(boron difluorodimethylglyoximate cobalt (II) as a metal complex, 1 part of 2,2'-azobis(2-methylbutyronitrile) as a radical initiator, and 15 parts of ethyl acetate as an entrainer was added dropwise over 3 hours. After the dropwise addition was completed, the resulting mixture was allowed to stand at 105° C. for 1 hour. Thereafter, 0.5 part of 2,2'-azobis(2-methylbutyronitrile) and 12 parts of xylene were further added thereto for a period of 1 hour. After the dropwise addition was completed, the resulting mixture was allowed to stand at 105° C. for 1 hour to obtain a macromonomer solution with a solids content of 55%.

Xylene and ethyl acetate were removed from the oligomer solution thus obtained to adjust its solids content to 98% or higher. The mixture was diluted with ethylene glycol monobutyl ether to obtain a macromonomer solution (MM-2) with a solids content of 65%. The resulting macromonomer had an average of 1.0 polymerizable double bond per molecule, comprised a terminal methacrylate-type macromonomer as a main component, and had a weight average molecular weight of 2,000.

Synthesis Example 3

16 parts of ethylene glycol monobutyl ether and 9.15 parts of 2,4-diphenyl-4-methyl-1-pentene (hereafter, sometimes referred to as "MSD") were placed into a reaction vessel equipped with a thermometer, a thermostat, a stirrer, a reflux condenser, a nitrogen inlet tube, and a dropper. The reaction mixture was stirred at 160° C. while blowing nitrogen gas thereinto. A mixture of 50 parts of n-butyl methacrylate, 50 parts of 2-hydroxyethyl methacrylate, and 7 parts of di-tertiary-amylperoxide was added thereto dropwise over 3 hours and stirred for 2 hours without changing the temperature. The resulting mixture was cooled to 30° C. and diluted with ethylene glycol monobutyl ether to obtain a macromonomer solution (MM-3) with a solids content of 65%. The macromonomer thus obtained had a weight average molecular weight of 2,100. According to an analysis by proton NMR, 97% or more of the ethylene unsaturated groups derived from MSD were located at the ends of a polymer chain, and 2% thereof disappeared.

Note that the above-described analysis by proton NMR was carried out in the following manner. Using heavy chloroform as a solvent, the following peaks before and after the polymerization reaction were measured: peaks based on protons of unsaturated groups in MSD (4.8 ppm, 5.1 ppm); peaks based on protons of ethylene unsaturated groups at the ends of a macromonomer chain (5.0 ppm, 5.2 ppm); and a peak of aromatic protons derived from MSD (7.2 ppm). It was assumed that the aromatic protons (7.2 ppm) derived from the above-described MSD remained the same before and after the polymerization reaction. Using this value as a reference, each unsaturated group (unreacted, macromonomer chain end, disappeared) was quantified.

Synthesis Examples 4-7

Synthesis was carried out in the same manner as in Synthesis Example 3, except that the monomer components shown in Table 1 were used, thereby obtaining macromonomer solutions (MM-4 to MM-7) having a solids content of 65%.

Synthesis Example 8

40 parts of ethylene glycol monobutyl ether was placed into a reaction vessel equipped with a thermometer, a thermostat, a stirrer, a reflux condenser, and a dropper. The resulting reaction mixture was heated to 60° C. while supplying nitrogen gas into the liquid. A mixture of 35 parts of N-isopropylacrylamide, 35 parts of N,N-dimethyl acrylamide, 30 parts of 2-hydroxyethyl acrylate, and 80 parts of ethylene glycol monobutyl ether and a mixture of 0.15 part of 2,2'-azobis(2,4-dimethylvaleronitrile) and 24 parts of methyl ethyl ketone were added dropwise over 4 hours each to the flask. After the dropwise addition was completed, the resulting mixture was aged for 1 hour. A mixture of 0.15 part of 2,2'-azobis(2,4-dimethylvaleronitrile) and 6 parts of methyl ethyl ketone was further added dropwise to the flask for a period of 1 hour. After the dropwise addition was completed, the mixture was aged for 1 hour and cooled to obtain a polymer solution with a solids content of 40%. The polymer solution thus obtained was precipitated in a diethyl ether, and the resulting precipitate was dried under reduced pressure to obtain a copolymer (P-1) with a solids content of 99% or higher. The LCST of a 1% aqueous solution of this copolymer measured by a cloud temperature method was 57° C.

Synthesis Examples 9-13

Synthesis was carried out in the same manner as in Synthesis Example 8, except that the monomer components shown in Table 2 were used, thereby obtaining copolymers (P-2 to P-6). Table 2 also shows the LCST of each copolymer measured by the cloud temperature method.

TABLE 2

| | | P-1 | P-2 | P-3 | P-4 | P-5 | P-6 |
|---|---|---|---|---|---|---|---|
| N-Substituted (meth)acrylamide derivatives | N-Isopropyl-acrylamide | 35 | 60 | 50 | | | 100 |
| | N,N-Dimethyl-acrylamide | 35 | 10 | 20 | 80 | 80 | |
| | N-Hydroxyethyl-acrylamide | | 30 | | | | |
| | N-Methoxymethyl-acrylamide | | | 30 | | | |

TABLE 1

| | MM-1 | MM-2 | MM-3 | MM-4 | MM-5 | MM-6 | MM-7 |
|---|---|---|---|---|---|---|---|
| n-Butyl methacrylate | 50 | 50 | 50 | 85 | 50 | | |
| 2-Ethylhexyl methacrylate | | | | | | 88 | |
| 2-Ethylhexyl acrylate | | | | | | | |
| Stearyl methacrylate | | | | 15 | | | |
| 2-Hydroxyethyl methacrylate | 50 | 50 | 50 | | 50 | 10 | 80 |
| Methacrylic acid | | | | | | 2 | 20 |
| Mercaptopropionic acid | 8 | | | | | | |
| Glycidyl methacrylate | 11 | | | | | | |
| Cobalt complex | | 0.01 | | | | | |
| 2,4-Diphenyl-4-methyl-1-pentene | | | 9.15 | 8 | 4.5 | 6.76 | 10.5 |
| 2,2'-Azobisisobutyronitrile | 2 | | | | | | |
| 2,2'-Azobis(2-methylbutyronitrile) | | 1 | | | | | |
| Di-tertiary-amylperoxide | | | 7 | 6 | 9 | 5 | 8 |
| Weight average molecular weight | 3000 | 2000 | 2100 | 2300 | 4000 | 2100 | 2500 |

TABLE 2-continued

|  |  | P-1 | P-2 | P-3 | P-4 | P-5 | P-6 |
|---|---|---|---|---|---|---|---|
| Other monomers | 2-Hydroxyethyl acrylate | 30 |  |  |  |  |  |
|  | Ethyl acrylate |  |  |  |  | 20 | 10 |
|  | Acrylic acid |  |  |  |  |  | 10 |
| LCST (° C.) |  | 57 | 82 | 78 | >100 | >100 | 31 |

Synthesis Example 14

15.4 parts of macromonomer solution (MM-1) with a solids content of 65%, 20 parts of ethylene glycol monobutyl ether, and 30 parts of diethylene glycol monoethyl ether acetate were placed into a reaction vessel equipped with a thermometer, a thermostat, a stirrer, a reflux condenser, and a dropper. The reaction mixture was heated to 85° C. while supplying nitrogen gas into the liquid. A mixture of 31.5 parts of N-isopropylacrylamide, 31.5 parts of N,N-dimethyl acrylamide, 27 parts of 2-hydroxyethyl acrylate, 10 parts of ethylene glycol monobutyl ether, and 40 parts of diethylene glycol monoethyl ether acetate, and a mixture of 0.2 part of 2,2'-azobis(2-methylbutyronitrile) and 20 parts of ethylene glycol monobutyl ether were added dropwise to the flask over 4 hours each. After the dropwise addition was completed, the resulting mixture was aged for 2 hours. A mixture of 0.3 part of 2,2'-azobis(2,4-dimethylvaleronitrile) and 15 parts of ethylene glycol monobutyl ether was further added dropwise to the flask for a period of 1 hour. After the dropwise addition was completed, the mixture was aged for 1 hour, and diluted with ethylene glycol monobutyl ether to obtain a graft copolymer solution with a solids content of 35%. The polymer solution thus obtained was precipitated in diethyl ether, and the resulting precipitate was dried under reduced pressure to obtain a graft copolymer (GP-1) with a solids content of 99% or higher. The graft polymer had a molecular weight measured by GPC of $20 \times 10^4$.

Synthesis Examples 15-29

Synthesis was carried out in the same manner as in Synthesis Example 14, except that the monomer components shown in Table 3 were used, thereby obtaining graft polymers (GP-2 to GP-16). Table 3 also shows the molecular weight and the LCST of the main chain portion of each graft polymer.

TABLE 3

|  |  | GP-1 | GP-2 | GP-3 | GP-4 | GP-5 | GP-6 | GP-7 | GP-8 |
|---|---|---|---|---|---|---|---|---|---|
| Macromonomers | 65% MM-1 | 15.4 |  |  |  |  |  |  |  |
|  | 65% MM-2 |  | 15.4 |  |  |  |  |  |  |
|  | 65% MM-3 |  |  | 15.4 |  |  |  |  | 15.4 |
|  | 65% MM-4 |  |  |  | 15.4 |  |  |  |  |
|  | 65% MM-5 |  |  |  |  | 15.4 |  |  |  |
|  | 65% MM-6 |  |  |  |  |  | 15.4 |  |  |
|  | 65% MM-7 |  |  |  |  |  |  | 15.4 |  |
| N-Substituted (meth)acrylamide derivatives | N-Isopropylacrylamide | 31.5 | 31.5 | 31.5 | 31.5 | 31.5 | 31.5 | 31.5 | 31.5 |
|  | N,N-Dimethylacrylamide | 31.5 | 31.5 | 31.5 | 31.5 | 31.5 | 31.5 | 31.5 | 31.5 |
|  | N-Hydroxyethylacrylamide |  |  |  |  |  |  |  |  |
|  | N-Methoxymethylacrylamide |  |  |  |  |  |  |  |  |
| Other monomers | 2-Hydroxyethyl acrylate | 27 | 27 | 27 | 27 | 27 | 27 | 27 | 27 |
|  | Ethyl acrylate |  |  |  |  |  |  |  |  |
|  | Acrylic acid |  |  |  |  |  |  |  |  |
| Polymerization initiators | 2,2'-Azobis(2-methylbutyronitrile) | 0.2 | 0.2 | 0.2 | 0.2 | 0.2 | 0.2 | 0.2 | 15 |
|  | 2,2'-Azobis(2,4-dimethylvaleronitrile) | 0.3 | 0.3 | 0.3 | 0.3 | 0.3 | 0.3 | 0.3 | 0.5 |
| LCST of main chain portion (° C.) |  | 57 | 57 | 57 | 57 | 57 | 57 | 57 | 57 |
| Weight average molecular weight/$10^4$ |  | 20 | 19 | 19 | 19 | 23 | 19 | 19 | 1 |

|  |  | GP-9 | GP-10 | GP-11 | GP-12 | GP-13 | GP-14 | GP-15 | GP-16 |
|---|---|---|---|---|---|---|---|---|---|
| Macromonomers | 65% MM-1 |  |  |  |  |  |  |  |  |
|  | 65% MM-2 |  |  |  |  |  |  |  |  |
|  | 65% MM-3 |  | 76.9 | 7.7 | 15.4 | 15.4 | 15.4 | 15.4 | 15.4 |
|  | 65% MM-4 |  |  |  |  |  |  |  |  |
|  | 65% MM-5 |  |  |  |  |  |  |  |  |
|  | 65% MM-6 |  |  |  |  |  |  |  |  |
|  | 65% MM-7 |  |  |  |  |  |  |  |  |
| N-Substituted (meth)acrylamide derivatives | N-Isopropylacrylamide | 35 | 17.5 | 33.3 | 54 | 45 |  |  | 90 |
|  | N,N-Dimethylacrylamide | 35 | 17.5 | 33.3 | 9 | 18 | 72 | 72 |  |
|  | N-Hydroxyethylacrylamide |  |  |  | 27 |  |  |  |  |
|  | N-Methoxymethylacrylamide |  |  |  |  | 27 |  |  |  |
| Other monomers | 2-Hydroxyethyl acrylate | 30 | 15 | 28.4 |  |  |  |  |  |
|  | Ethyl acrylate |  |  |  |  |  | 18 | 9 |  |
|  | Acrylic acid |  |  |  |  |  |  | 9 |  |
| Polymerization initiators | 2,2'-Azobis(2-methylbutyronitrile) | 0.2 | 0.2 | 0.2 | 0.2 | 0.2 | 0.2 | 0.2 | 0.2 |
|  | 2,2'-Azobis(2,4-dimethylvaleronitrile) | 0.3 | 0.3 | 0.3 | 0.3 | 0.3 | 0.3 | 0.3 | 0.3 |
| LCST of main chain portion (° C.) |  | 57 | 57 | 57 | 82 | 78 | >100 | >100 | 31 |
| Weight average molecular weight/$10^4$ |  | 20 | 12 | 20 | 19 | 19 | 19 | 19 | 19 |

Synthesis Example 30

38.5 parts of deionized water and 0.1 part of Newcol 707SF (produced by Nippon Nyukazai Co., Ltd., an anionic surfactant having a polyoxyethylene chain, nonvolatile content: 30%) were placed into a 2-liter four-necked flask. After replacing the air in the flask with nitrogen gas, the flask was maintained at 85° C. Into this flask were added a 3% portion of a preemulsion prepared by emulsifying 52.3 parts of deionized water, 30 parts of methyl methacrylate, 10 parts of styrene, 20 parts of n-butyl acrylate, 30 parts of 2-ethylhexyl acrylate, 10 parts of hydroxyethyl acrylate, and 1.6 parts of Newcol 707SF, and a 25% portion of 10.4 parts of solution prepared by dissolving 0.4 part of ammonium persulfate in 10 parts of deionized water. Twenty minutes after the addition, the remaining preemulsion and the remaining aqueous solution of ammonium persulfate were added dropwise to the reaction mixture over 4 hours. After the dropwise addition was completed, the resulting mixture was maintained at 85° C. for 2 hours and cooled to an ordinary temperature to obtain Acrylic Resin Emulsion I with a solids content of 50%.

Example 1

1.5 g of the graft polymer GP-1 obtained in Synthesis Example 14 was dissolved in 17.0 g of deionized water to obtain Solution 1, which is transparent and viscous at ordinary temperatures. The total amount of Solution 1 was added to 100 g of Emulsion I obtained in Synthesis Example 30 described above and stirred well to obtain the emulsion composition of Example 1.

Examples 2-6 and Comparative Examples 1 and 2

Synthesis was carried out in the same manner as in Example 1, except that the formulations shown in Table 4 were used, thereby obtaining the emulsion compositions of Examples 2-6 and Comparative Examples 1 and 2.

Comparative Example 3

1.6 g of a commercially available urethane associative rheology control agent called Adecanol UH-756VF (produced by ADEKA Corporation, active ingredient: 32%) and 13.2 g of deionized water were added to 100 g of Emulsion I to obtain the composition of Comparative Example 3.

Comparative Example 4

Only 13.6 g of deionized water was added to 100 g of Emulsion I to obtain the composition of Comparative Example 4.

Evaluation of Thermal Response

The changes in viscosity according to the temperature of the compositions of Examples 1-6 and Comparative Examples 1-6 ware measured to evaluate the thermal response thereof. The viscosity was measured using a cone and plate viscometer RheoStress RS15 (product name, produced by Haake) at the shear rate of 5 $sec^{-1}$ while changing the temperature (30° C., 50° C., and 70° C.). Table 5 shows the viscosity (Pa·sec) at each temperature together with evaluations of the thermal response (shown below).

A: A great decrease in viscosity was observed between 30° C. and 50° C. or between 50° C. and 70° C. (viscosity became ⅓ or less).

C: No great decrease in viscosity was observed.

TABLE 5

|  |  | Examples |  |  |  |  |  | Comparative Examples |  |  |  |
|---|---|---|---|---|---|---|---|---|---|---|---|
|  |  | 1 | 2 | 3 | 4 | 5 | 6 | 1 | 2 | 3 | 4 |
| Viscosity Pa·s | 30° C. | 7.0 | 6.8 | 6.8 | 8.0 | 10.0 | 6.0 | 3.0 | 1.8 | 9.0 | 0.65 |
|  | 50° C. | 6.9 | 6.8 | 6.7 | 7.8 | 9.0 | 6.0 | 2.8 | 1.5 | 7.6 | 0.64 |
|  | 70° C. | 2.2 | 2.1 | 2.0 | 2.4 | 2.5 | 1.9 | 2.0 | 1.6 | 6.5 | 0.62 |
| Thermal response |  | A | A | A | A | A | A | C | C | C | C |

Example 7

1.5 g of graft polymer GP-3 obtained in Synthesis Example 16 was dissolved in 17.0 g of deionized water to obtain Solution 2, which is transparent and viscous at ordinary temperatures. A bake-cured-type aqueous enamel coating composition, ASCA BAKE, TW-400 black (produced by Kansai Paint Co., Ltd., an aqueous enamel coating composition, acrylic resin/melamine resin base) was adjusted to have a solids concentration of 40%. The total amount of Solution 2 was added to 100 g of the above adjusted coating composition (amount of binder component: 28.4 g) to obtain the aqueous enamel coating composition of Example 7.

TABLE 4

|  | Examples |  |  |  |  |  | Comparative Examples |  |  |  |
|---|---|---|---|---|---|---|---|---|---|---|
|  | 1 | 2 | 3 | 4 | 5 | 6 | 1 | 2 | 3 | 4 |
| GP-1 | 1.5 |  |  |  |  |  |  |  |  |  |
| GP-2 |  | 1.5 |  |  |  |  |  |  |  |  |
| GP-3 |  |  | 1.5 |  |  |  |  |  |  |  |
| GP-4 |  |  |  | 1.5 |  |  |  |  |  |  |
| GP-5 |  |  |  |  | 1.5 |  |  |  |  |  |
| GP-6 |  |  |  |  |  | 1.5 |  |  |  |  |
| GP-7 |  |  |  |  |  |  | 1.5 |  |  |  |
| GP-16 |  |  |  |  |  |  |  | 1.5 |  |  |
| Adecanol UH756VF |  |  |  |  |  |  |  |  | 1.6 |  |
| Deionized water | 17 | 17 | 17 | 17 | 17 | 17 | 17 | 17 | 13.6 | 13.6 |
| Emulsion I | 100 | 100 | 100 | 100 | 100 | 100 | 100 | 100 | 100 | 100 |

Examples 8 to 15 and Comparative Examples 5 to 9

Aqueous enamel coating compositions of Examples 8 to 18 and Comparative Examples 5 to 9 were obtained in the same manner as in Example 7 except that the formulations shown in Table 6 were used.

B: No sagging was observed on the coated surface but slight sagging was observed on the lower edge of the round hole.

C: Sagging was observed on the coated surface.

Finished Appearance

TABLE 6

| | Examples | | | | | | | | | | | | Comparative Examples | | | | |
|---|---|---|---|---|---|---|---|---|---|---|---|---|---|---|---|---|---|
| | 7 | 8 | 9 | 10 | 11 | 12 | 13 | 14 | 15 | 16 | 17 | 18 | 5 | 6 | 7 | 8 | 9 |
| GP-3 | 1.5 | 3.0 | | | | | | | | | | | | | | | |
| GP-4 | | | 0.2 | | | | | | | | | | | | | | |
| GP-5 | | | | 5.0 | | | | | | | | | | | | | |
| GP-6 | | | | | 3.0 | | | | | | | | | | | | |
| GP-7 | | | | | | | | | | | | | 1.5 | | | | |
| GP-8 | | | | | | 1.5 | | | | | | | | | | | |
| GP-9 | | | | | | | | | | | | | | 1.5 | | | |
| GP-10 | | | | | | | 1.5 | | | | | | | | | | |
| GP-11 | | | | | | | | 1.5 | | | | | | | | | |
| GP-12 | | | | | | | | | 1.5 | | | | | | | | |
| GP-13 | | | | | | | | | | 1.5 | | | | | | | |
| GP-14 | | | | | | | | | | | 1.5 | | | | | | |
| GP-15 | | | | | | | | | | | | 1.5 | | | | | |
| GP-16 | | | | | | | | | | | | | | | 1.5 | | |
| Adecanol UH756VF | | | | | | | | | | | | | | | | 1.6 | |
| Deionized water | 17 | 34 | 17 | 17 | 17 | 17 | 17 | 17 | 17 | 17 | 17 | 17 | 17 | 17 | 17 | 13.6 | 13.6 |
| 50% ASCA BAKE black | 100 | 100 | 100 | 100 | 100 | 100 | 100 | 100 | 100 | 100 | 100 | 100 | 100 | 100 | 100 | 100 | 100 |

Evaluation of Coatability and Finished Appearance of the Coated Surface

A cold rolled steel plate (dimensions: 7.5×15×0.2 cm, provided with a round hole having a diameter of 5 mm at the central portion, 1.5 cm below the upper edge of the plate) whose surface had been treated with Palbond #3030 (produced by Nihon Parkerizing Co., Ltd., zinc phosphate-based) was used. Electron GT-10 (produced by Kansai Paint Co., Ltd., an epoxy-based cationic electrodeposition coating composition) was electrodeposited on the plate described above to have a thickness of 20 μm when dried, and Amilac N-2 sealer (produced by Kansai Paint Co., Ltd., an aminopolyester resin-based intermediate coating composition) was further coated thereon to a thickness of 30 μm. The resulting plate was used as the substrate. After adjusting the viscosity of the coating compositions to about 30 seconds (Ford cup No. 4, 20° C.), the colored coating compositions obtained in the Examples and Comparative Examples were electrostatically spray-coated onto the substrate at a temperature of 25° C. and a relative humidity of 70%. The targeted film thickness was 45±5 μm when cured.

The coated plates were allowed to stand horizontally, and then preliminarily dried at 80° C. for 5 minutes. Thereafter, the plates were fixed at a position raised from the horizontal plane by 70 to 80 degrees, and subjected to baking at 150° C. for 20 minutes by hot-air drying. The sagging and finished appearance of the plates after baking were evaluated.

Sagging

A: The coating composition was uniformly cured without sagging on the coated surface.

A: The coated surface had an excellent finished appearance with satisfactory smoothness free from clouding, popping, and seeding.

B: The coated surface was free from clouding, popping, and seeding but slightly inferior in smoothness.

C: The coated surface had either clouding, popping, or seeding, resulting in an unsatisfactory finished appearance. The finished appearance was not evaluated for the samples that were evaluated as C in the sagging evaluation.

Table 7 shows the evaluation results.

TABLE 7

| | Examples | | | | | | | | | | | | Comparative Examples | | | | |
|---|---|---|---|---|---|---|---|---|---|---|---|---|---|---|---|---|---|
| | 7 | 8 | 9 | 10 | 11 | 12 | 13 | 14 | 15 | 16 | 17 | 18 | 5 | 6 | 7 | 8 | 9 |
| Sagging | A | A | B | A | A | B | A | A | A | A | A | A | C | C | C | B | C |
| Finished appearance | A | A | A | B | A | A | B | B | A | A | B | B | — | — | — | C | — |

The invention claimed is:

1. A rheology modifier for an aqueous coating composition comprising a graft copolymer consisting of:
   (A) a main chain containing an N-substituted (meth)acrylamide compound and having a lower critical solution temperature in water of 40° C. or higher; and
   (B) a hydrophobic side chain,
   wherein the hydrophobic side chain is derived from a hydrophobic macromonomer obtained by copolymerization of a monomer mixture comprising an alkyl (meth)acrylate;
   wherein the graft copolymer is obtained by a radical copolymerization of an unsaturated monomer mixture containing the N-substituted (meth)acrylamide compound and the hydrophobic macromonomer; and
   wherein the unsaturated monomer mixture comprises 1 to 99 parts by mass of the N-substituted (meth)acrylamide compound and 1 to 30 parts by mass of the hydrophobic macromonomer relative to 100 parts by mass of the unsaturated monomer mixture.

2. An aqueous coating composition comprising the rheology modifier for an aqueous coating composition of claim 1.

3. An article coated with the aqueous coating composition of claim 2.

* * * * *